United States Patent [19]

Jeffs

[11] Patent Number: 5,028,482
[45] Date of Patent: Jul. 2, 1991

[54] LATEX COATED INORGANIC FILLERS AND PROCESS FOR PREPARING SAME

[75] Inventor: David G. Jeffs, St. Austell, United Kingdom

[73] Assignee: ECC International Limited, United Kingdom

[21] Appl. No.: 403,732

[22] Filed: Sep. 6, 1989

Related U.S. Application Data

[63] Continuation-in-part of Ser. No. 283,564, Dec. 13, 1988, which is a continuation-in-part of Ser. No. 902,158, Aug. 29, 1986, Pat. No. 4,800,103.

[30] Foreign Application Priority Data

Jun. 26, 1989 [GB] United Kingdom ............... 89146187

[51] Int. Cl.$^5$ ............................................. B32B 19/02
[52] U.S. Cl. .................................... 428/323; 427/221; 428/407; 523/205; 523/206; 523/209; 523/334; 523/342
[58] Field of Search ................ 427/221; 523/205, 206, 523/209, 333, 334, 342; 524/445, 501; 428/403, 407, 323; 106/447; 252/351

[56] References Cited

U.S. PATENT DOCUMENTS

| | | | |
|---|---|---|---|
| 3,920,604 | 11/1975 | Berg et al. | 523/333 |
| 3,953,389 | 4/1976 | Holliday et al. | 523/330 |
| 4,065,426 | 12/1977 | Yamawaki et al. | 523/352 |
| 4,244,863 | 1/1981 | Hemmerich et al. | 523/334 |
| 4,375,497 | 3/1983 | Sandstrom | 523/334 |
| 4,481,329 | 11/1984 | Ambler et al. | 524/501 |
| 4,578,411 | 3/1986 | Budd et al. | 523/206 |
| 4,599,114 | 7/1986 | Atkinson | 106/448 |
| 4,601,153 | 7/1986 | Sobajima et al. | 523/205 |
| 4,603,167 | 7/1986 | Mahalek et al. | 524/487 |
| 4,608,401 | 8/1986 | Martin | 523/205 |
| 4,642,330 | 2/1987 | Quinn | 524/606 |
| 4,788,231 | 11/1988 | Smigerski et al. | 524/434 |

Primary Examiner—Michael Lusignan
Assistant Examiner—Terry J. Owens
Attorney, Agent, or Firm—Klauber & Jackson

[57] ABSTRACT

A process for preparing an inorganic filler comprises admixing a particulate inorganic material with a natural or synthetic latex composition and an aqueous suspension of fine carbon black, and dewatering and drying the resultant mixture, the amount of the natural or synthetic latex composition added being such as to provide a coating on the inorganic mineral of from 1% to 10% by weight of latex solids based on the weight of dry inorganic material.

41 Claims, No Drawings

LATEX COATED INORGANIC FILLERS AND PROCESS FOR PREPARING SAME

This is a continuation-in-part of copending application Ser. No. 283,564, filed Dec. 13th, 1988 which is a continuation-in-part of application Ser. No. 902,158, filed Aug. 29, 1986 and issued as U.S. Pat. No. 4,800,103.

BACKGROUND OF THE INVENTION

This invention relates to inorganic fillers for organic polymer compositions, to a process for preparing such fillers, to organic polymer compositions including such fillers and to articles made from such organic polymer compositions.

DESCRIPTION OF THE PRIOR ART

U.S. Pat. No. 4,366,285 relates to a process for producing an elastomer-filler mixture optionally containing an extender oil. The composite material contains from 20 to 70% by weight of filler based on the weight of the elastomer. In some of the composite materials, a high-aromatic extender oil and a finely divided carbon black are included.

U.S. Pat. No. 3,080,256 describes a process in which an aqueous suspension of clay, for example kaolin clay, is treated first with a polyamine and then with an organic material which may, for example, be an emulsion of a polyester resin. The dewatered and dried product may be used as a filler for organic polymers such as a polyester resin composition. The process disclosed in this patent thus requires a pretreatment step with a polyamine in contrast to the present invention which requires no such pretreatment step with a polyamine.

Our U.S. Pat. No. 4,800,103 (application Ser. No. 902,158) of which this application is a continuation-in-part, claims a process for preparing an inorganic filler which comprises adding to a particulate inorganic material selected from the group consisting of kaolinitic clay, a calcined kaolinitic clay, a calcium carbonate, wollastonite, bauxite, talc or mica, a natural or synthetic latex composition which comprises a suspension of polymer particles in water wherein the latex solids are selected from the group consisting of a natural rubber, a natural rubber which has been substituted with functional groups, a styrene butadiene rubber (SBR) and a poly(vinyl acetate), and dewatering and drying the resultant mixture, the amount of the natural or synthetic latex composition added being such as to provide from 1% to 10% by weight of latex solids based on the weight of dry inorganic material.

In a known process for making glass mat reinforced thermoplastic sheet material a mixture of chopped glass fibres, polypropylene powder and an inorganic filler such as kaolin, calcium carbonate, talc or mica is dispersed in water containing an anionic surfactant using a high speed mixer to form a stable foam and this foam is spread uniformly over the surface of a travelling wire mesh felt similar to that conventionally used in a Fourdrinier paper making machine and the aqueous phase is withdrawn through the wire mesh by gravity and suction. The mat of solid materials thus formed on the upper surface of the wire mesh is then dried at a temperature of about 100° C. and the resultant dried mat may be cut into pieces of suitable size, stacked if desired to form a multi-layer sheet material and pressed between steel plates at a temperature of about 200° C. and allowed to cool in the press to form a sheet-like component such as a car body panel. Alternatively, the stacks of cut pieces may be heated to about 200° C. by means of a current of hot air or by infra red radiation and subsequently allowed to cool in a press at about 60° C. to form the sheet-like material.

In addition to the glass fibres, polypropylene and inorganic filler it is often necessary to include in the starting mixture for a glass mat reinforced thermoplastic material a small amount, normally up to about 4% by weight of the total solid material, of carbon black. This is introduced not only to render the final sheet material black in colour, as is often required in commerce, but also to provide a screening effect against the harmful action of ultraviolet radiation on the material. However, when carbon black is introduced into the starting mixture, problems are experienced because of the well known difficulties of handling fine carbon black powder without creating a cloud of black particles which settles out over a wide area. This problem is especially severe when dry carbon black is mixed with a dry thermoplastic material. The retention of the fine carbon black particles in the mat during the forming operation on the wire mesh has also been found to be poor and it is generally found that the carbon black is unevenly dispersed in the final dried and pressed material with the result that the sheet material has a veined or mottled appearance with dark areas having a high concentration of carbon black alternating with areas which are light in colour and almost translucent.

Similar handling problems arise when fine carbon black is incorporated in injection moulding thermoplastic compositions in which carbon black in an amount of about 1% by weight of the total composition is normally required, and in thermosetting dough moulding compounds in which the amount of carbon black is usually about 0.5% by weight based on the total weight of the compound.

Carbon black is the term used to describe a wide range of fine carbon products which may be made by partial combustion or thermal decomposition of hydrocarbons in the vapour phase. The ultimate colloidal units of carbon black may occur as aggregates, which are fused assemblies of particles. Typically, carbon blacks may have particle diameters up to 500 nanometers. Most carbon blacks have an elemental carbon composition greater than 90%.

SUMMARY OF THE PRESENT INVENTION

The present invention provides a method of incorporating finely divided carbon black pigment into a thermoplastic or thermosetting organic polymer composition in such a way that the handling problems are overcome and the carbon black is substantially uniformly dispersed in the polymer composition.

According to a first aspect of the present invention there is provided a process for preparing a latex coated inorganic filler which process comprises:
 (i) providing a particulate inorganic material;
 (ii) coating said particulate inorganic material with a natural or synthetic latex composition and an aqueous suspension of fine carbon black; and
 (iii) dewatering and drying the resultant mixture;
 said natural or synthetic latex composition comprising a suspension of polymer particles in water and being added in an amount such as to provide a coating on the particles of inorganic filler of from 1% to 10% by weight of latex solids based on the weight of dry inorganic material.

According to a second aspect of the present invention there is provided a process for preparing a latex coated inorganic filler comprising: combining, in an aqueous suspension, a particulate inorganic material, a natural or synthetic latex composition and carbon black; and dewatering and drying the resultant mixture; said natural or synthetic latex composition being employed in an amount such as to provide a coating on the particles of inorganic filler of from 1% to 10% by weight of latex solids based o the weight of dry inorganic material.

According to a third aspect of the present invention, there is provided a coated particulate inorganic material comprising a natural or synthetic elastomer and carbon black, wherein the elastomer is present in the coating in an amount of from 1% to 10% by weight, based on the weight of inorganic material.

According to a fourth aspect of the present invention, there is provided a process for preparing an inorganic filler comprising:
  (a) forming a dispersed aqueous suspension of fine carbon black which contains from about 5% to 25% by weight, on a dry weight basis, of the carbon black;
  (b) forming a dispersed aqueous suspension of a white inorganic material containing from about 50% to about 60% by weight on a dry weight basis, of the inorganic material;
  (c) combining the aqueous suspension of the inorganic material with a natural or synthetic latex composition, the latex being employed in an amount such as to provide a coating on the particles of inorganic filler of from about 1% to about 10% by weight of elastomer solids, based on the weight of the inorganic mineral;
  (d) combining the dispersed aqueous suspension of carbon black with the inorganic mineral/latex suspension formed in step (c) in proportions such that the quantity of carbon black is from about 0.1% to about 10% on a dry weight basis, based on the weight of the inorganic mineral; and
  (e) spray drying the suspension formed in step (d) to form hollow microspheres of substantially dry material having diameters in the range of from about 0.02 mm to about 0.5 mm.

According to a fifth aspect of the present invention, there is provided a process for preparing an inorganic filler comprising:
  (a) forming a dispersed aqueous suspension of fine carbon black which contains from about 5% to 25% by weight, on a dry weight basis, of the carbon black;
  (b) forming a dispersed aqueous suspension of a white inorganic material containing from about 50% to about 60% by weight on a dry weight basis, of the inorganic material;
  (c) combining the aqueous suspension of the inorganic material with the dispersed aqueous suspension of carbon black formed in step (a) in proportions such that the quantity of carbon black is from about 0.1% to about 10% on a dry weight basis, based on the weight of the inorganic mineral;
  (d) combining the inorganic mineral/carbon black formed in step (c) with a natural or synthetic latex composition, the latex being employed in an amount such as to provide a coating on the particles of inorganic filler of from about 1% to about 10% by weight of elastomer solids, based on the weight of the inorganic mineral; and
  (e) spray drying the suspension formed in step (d) to form hollow microspheres of substantially dry material having diameters in the range of from about 0.02 mm to about 0.5 mm.

According to a sixth aspect of the present invention, there is provided an organic polymer composition which comprises an organic polymeric material and a latex coated inorganic filler wherein the filler has been treated, in aqueous suspension, with a natural or synthetic latex composition and carbon black, dewatered and dried to form a coating on the filler, the filler being coated with from 1% to 10% by weight of latex solids, based on the weight of dry inorganic material.

In the organic polymer composition, the coated inorganic filler should be employed in an amount such as to provide an amount of carbon black in the range of from 0.1 to 5.0% by weight, based on the weight of the total organic polymer composition.

The particulate inorganic material may be combined or admixed with the latex composition and carbon black sequentially or simultaneously. Admixing may be sequential with the latex composition first being combined in aqueous suspension with the particulate inorganic material to which a dispersed aqueous suspension of the carbon black is then added. Alternatively, and presently preferred, is first to combine the dispersed aqueous suspension of carbon black with an aqueous suspension of the particulate inorganic material to form a mixed suspension and then to add the latex composition. The resultant mixture of carbon black, inorganic filler and latex may be dewatered and dried by spray drying to form hollow dry microspheres.

The inorganic material may be chosen from a kaolinitic clay (e.g. kaolin or ball clay), a calcined kaolinitic clay, calcium carbonates, silicates of aluminium and calcium (e.g. the natural calcium silicate known as wollastonite), bauxite, talc, mica, alumina trihydrate, silica, carbonates and hydroxides of magnesium (e.g. natural hydrotalcite), dolomite (i.e. the natural double carbonate of calcium and magnesium), calcium sulphate (e.g. gypsum), and titanium dioxide. The inorganic material may be natural or synthetic and, in particular, both natural and synthetic forms of calcium carbonate, silicates of aluminium and calcium, silica, carbonates and hydroxides of magnesium, calcium sulphate and titanium dioxide are within the scope of this invention. Where the material is synthetic it may be precipitated (as with calcium carbonate, silica and titanium dioxide). The inorganic materials specified above may be regarded as white inorganic materials; the term "white" used in relation to "inorganic material" does not mean, however, that the mineral necessarily has a pure white colour, but that it is substantially free of any strong non-white hue. Many of the inorganic materials which may be employed in the present invention are cystalline.

Preferably, the particles should be no larger than about 100 microns, more preferably 50 microns and most preferably 20 microns, in diameter.

Thus, the invention enables carbon black to be incorporated into an organic polymer composition as a component of a coating on an inorganic filler material, the carbon black being held in the coating by a film of a natural or synthetic elastomer material. The three main components (carbon black, inorganic filler and latex) are dispersed together in water preferably containing a dispersing agent, and dewatered and dried, for example by spray drying to form dry microspheres.

Preferably, the process of the invention comprises the following steps:

a) fine carbon black is mixed with water containing a dispersing agent to form a suspension preferably containing from about 5% to about 25% by weight of carbon black;

b) a suspension preferably containing from 50% to 65% on a dry weight basis of a white inorganic filler and a dispersing agent for the inorganic filler is mixed with the carbon black suspension formed in step a) in proportions such that the quantity of carbon black is preferably from 0.1% to 10% on a dry weight basis based on the weight of the inorganic filler;

c) there is mixed with the inorganic filler/carbon black suspension formed in step b) sufficient of a natural or synthetic latex composition to provide from 1% to 10% by weight of latex solids, based on the weight of the inorganic filler; and d) the mixed suspension formed in step c) is spray dried in a spray dryer to form hollow microspheres of substantially dry material having diameters preferably in the range from about 0.02 mm to about 0.5 mm.

In step a) the dispersing agent may be, for example, a water-soluble salt of poly(acrylic acid), poly(methacrylic acid) or of a copolymer containing from 10% to 80% by weight of acrylonitrile or methacrylonitrile monomer units and from 90% to 20% by weight of acrylic acid or methacrylic acid monomer units. The number average molecular weight of the water soluble polymer is preferably not more than about 10,000. The amount of the dispersing agent used is preferably in the range from 0.1% to 5% by weight, based on the weight of dry carbon black.

In step b) the inorganic filler may be a white inorganic material as listed above. The dispersing agent for the inorganic filler is advantageously a water soluble salt of poly(acrylic acid) or poly(methacrylic acid) having a number average molecular weight of not more than 10,000. The inorganic filler does not require any chemical pretreatment other than dispersion with a dispersing agent. The amount of the dispersing agent used is preferably in the range of from 0.05% to 0.5% by weight, based on the weight of the dry inorganic filler.

The latex may be of a natural rubber, or of a natural rubber which has been substituted with functional groups, or a synthetic rubber such as a styrene butadiene rubber (SBR). Other suitable latices include those formed from acrylic copolymers (either elastomeric or non-elastomeric, although elastomeric is preferred) and non-elastomeric materials such as poly(vinyl acetate) and copolymers of vinyl acetate. The latex composition, which is a stabilised suspension of polymer particles in water, typically contains about 40% to 60% by weight of solids. The latex may be stabilised with the aid of a surfactant or a water-soluble colloid although a surfactant would normally be employed as it usually gives a latex of lower viscosity.

The acrylic copolymer may be a copolymer of a lower alkyl ester of acrylic acid with a lower alkyl ester of methacrylic acid. Particularly preferred are copolymers of ethyl acrylate and methyl methacrylate. Also suitable are copolymers of one or other or both of a lower alkyl ester of acrylic acid and a lower alkyl ester of methacrylic acid with a further monomer chosen from vinyl acetate, styrene, acrylonitrile and mixtures thereof. The alkyl chains of the lower alkyl esters of acrylic acid and methacrylic acid preferably have from one to four carbon atoms.

The copolymers of vinyl acetate may be those formed by copolymerising vinyl acetate with a copolymerising monomer chosen from a lower alkyl ester of acrylic acid, a lower alkyl ester of methacrylic acid, styrene, acrylonitrile and mixtures thereof.

The mixed suspension formed in step c) may also contain other ingredients which are required in certain organic polymer compositions such as antioxidants and metal deactivators. For example an antioxidant, which may be, for example, of the non-staining hindered phenol type, may be mixed with water to form a suspension containing from about 40% by weight to about 60% by weight of the dry antioxidant, and the suspension mixed with the suspension formed in step c) in proportions such as to provide from 0.1% to 10% by weight of the dry antioxidant based on the weight of the dry inorganic filler.

In step d) the inlet temperature of the spray dryer is preferably less than 400° C., and most preferably less than 350° C., in order to avoid thermal degradation of the elastomer material or combustion of the carbon black.

Coated inorganic material in accordance with the present invention may be incorporated into organic polymer compositions from which articles may be partially, or wholly, formed. The organic polymer composition into which the filler may be incorporated can be in a solid (i.e. powder) or liquid (i.e. resin) form. The coated inorganic filler of the present invention is particularly suited to organic polymer compositions in powder form.

The dry hollow microspheres prepared by the process of the present invention are found to be in the form of a free-flowing powder which can be easily incorporated into an organic polymer composition and the carbon black is so well bound into the microspheres that the material may be poured onto a sheet of white paper with at most only a trace of black staining being visible after removal of the microspheres. The microspheres may, by adjustment of the gas flow rate through the spray dryer and of the inlet temperature, be prepared of such a size that the retention of the microspheres in, for example, a glass mat reinforced thermoplastic composition is greatly improved. Most advantageously the microspheres should have diameters in the range from 0.3 mm to 0.5 mm.

In the present invention, any commercial grade of carbon black is suitable; however, fine carbon black, i.e. that having an average particle diameter no greater than 300 nanometers is particularly preferred.

The dry microspheres prepared in accordance with the invention have also been found to be very suitable for incorporation into organic polymer compositions such as injection moulding thermoplastic compositions and dough moulding thermosetting compositions.

The invention is illustrated by the following Examples.

EXAMPLE 1

A carbon black powder having an average particle diameter of 0.02 micrometer was dispersed in a quantity of water so as to form a suspension containing 20% by weight of the carbon black, there being dissolved in the water 2% by weight, based on the weight of the dry carbon black of a sodium polyacrylate dispersing agent having a number average molecular weight of 1680. The carbon black suspension was then added to a suspension which had been formed by mixing a suspension containing 60% by weight of a paper filler grade kaolin clay and 0.2% by weight, based on the weight of dry kaolin, of the same dispersing agent as was used for the carbon black, and a latex containing 50% by weight of an elastomeric acrylic copolymer of ethyl acrylate and methyl methacrylate in proportions such that the quantity of the dry elastomeric copolymer was 5% by weight, based on the weight of dry kaolin clay. The kaolin clay had a particle size distribution such that 20% by weight consisted of particles having an equivalent spherical diameter larger than 10 microns and 35% by weight consisted of particles having an equivalent spherical diameter smaller than 2 microns.

The carbon black suspension was mixed with the kaolin/elastomeric copolymer suspension in proportions such that the quantity of carbon black was 5% by weight, based on the weight of dry kaolin clay.

The resultant mixed suspension was fed to the atomizer of a spray dryer the inlet temperature of which was 300° C. and the solid components of the mixture were recovered in the form of dry hollow microspheres of diameters in the range from 0.3 to 0.5 mm.

EXAMPLE 2

A glass mat reinforced thermoplastic composition was prepared according to the following formulation:

| | |
|---|---|
| Chopped glass fibres | 40 g |
| Polypropylene powder (0.3 mm–0.5 mm diameter) | 110 g |
| Composite filler particles prepared in Example 1 | 50 g |

The ingredients were mixed into 7 liters of water containing 20 ml of an anionic surfactant using a high speed mixer to form a stable foam. The foam was distributed evenly over a wire mesh screen and the water removed by gravity and suction. The resultant felted mat was dried at 100° C. and then pressed at 200° C. between steel plates and allowed to cool in the press. The resultant glass mat reinforced polypropylene sheet was a uniform deep black in colour with no visible streaks, veins or mottling. The retention of the filler particles in the mat was also extremely good.

EXAMPLE 3

A further sample of the same carbon black powder as was used in Example 1 was dispersed in water containing 2% by weight, based on the weight of the dry carbon black, of the same dispersing agent as was used in Example 1 to form a suspension containing 20% by weight of the carbon black.

This suspension was then added to a suspension containing 60% by weight of a ground natural mica, having a particle size distribution such that substantially all of the particles had an equivalent spherical diameter smaller than 10 microns, and 0.2% by weight, based on the weight of dry mica, of the same dispersing agent as was used for the carbon black. To the mica/carbon black suspension thus formed, there was then added firstly a latex containing 50% by weight of the same acrylic copolymer as was used in Example 1 in proportions such that the quantity of the dry elastomeric copolymer was 5% by weight, based on the weight of dry mica, and secondly a suspension containing 50% by weight of a non-staining antioxidant of the hindered phenol type in proportions such that the quantity of the dry antioxidant was 1% by weight, based on the weight of dry mica. The quantity of carbon black in the resultant mixed suspension was 5% by weight, based on the weight of dry mica.

The resultant mixed suspension was spray dried under the same conditions as were described in Example 1 and the solid components of the mixture were recovered in the form of dry hollow microspheres of diameters in the range from 0.1 to 0.5 mm.

These microspheres were incorporated into a glass mat reinforced thermoplastic composition following the same formulation and method as were described in Example 2. The resultant glass mat reinforced polypropylene sheet was a uniform black in colour with no visible streaks, veins or mottling. The retention of the filler particles in the mat was also extremely good.

EXAMPLE 4

The experiment of Example 3 was repeated except that the mica was replaced by an equal quantity of a synthetic alumina trihydrate having a particle size distribution such that substantially all the particles had an equivalent spherical diameter smaller than 10 microns.

Again the resultant glass mat reinforced polypropylene sheet was a uniform black in colour with no visible streaks, veins or mottling. The retention of the filler particles in the mat was extremely good.

What we claim is:

1. A process for preparing a latex coated inorganic filler which process comprises:
    (i) providing a particulate inorganic material;
    (ii) coating said particulate inorganic material with a natural or synthetic latex composition and an aqueous suspension of fine carbon black; and
    (iii) dewatering and drying the resultant mixture;
    said natural or synthetic latex composition comprising a suspension of polymer particles in water and being added in an amount such as to provide a coating on the particles of inorganic material of from 1% to 10% by weight of latex solids based on the weight of dry inorganic material.

2. A process according to claim 1, wherein the aqueous suspension of carbon black is employed in an amount such as to provide in the coating from 0.1% to 10% by weight of dry carbon black based on the weight of the inorganic filler.

3. A process according to claim 1, wherein the aqueous suspension of carbon black contains from 5% to 25% by weight of carbon black.

4. A process according to claim 1, wherein the particulate inorganic material is in the form of an aqueous suspension.

5. A process according to claim 4, wherein the aqueous suspension of the inorganic material contains from 50% to 65% by weight of the inorganic material.

6. A process according to claim 1, wherein the mixture of inorganic material, latex and carbon black is spray dried in step (iii) to form hollow microspheres.

7. A process according to claim 1, wherein the aqueous suspension of the carbon black is dispersed with the aid of a dispersing agent.

8. A process according to claim 4, wherein the aqueous suspension of inorganic material is dispersed with the aid of a dispersing agent.

9. A process according to claim 1, wherein the particulate inorganic material is selected from the group consisting of kaolinitic clay, a calcined kaolinitic clay, a calcium carbonate, silicates of calcium and aluminium, bauxite, talc, mica, alumina trihydrate, silica, carbonates and hydroxides of magnesium, dolomite, calcium sulphate and titanium dioxide.

10. A process according to claim 1, wherein the latex solids are selected from the group consisting of a natural rubber, a natural rubber which has been substituted with functional groups, a synthetic rubber, an acrylic copolymer, a poly(vinyl acetate) and copolymers of vinyl acetate.

11. A process according to claim 10, wherein the acrylic copolymer is elastomeric.

12. A process according to claim 10, wherein the acrylic copolymer is non-elastomeric.

13. A process according to claim 10, wherein the acrylic copolymer is a copolymer of a lower alkyl ester of acrylic acid and a lower alkyl ester of methacrylic acid.

14. A process according to claim 10, wherein the acrylic copolymer is a copolymer of one or both of a lower alkyl ester of acrylic acid and a lower alkyl ester of methacrylic acid with a further monomer selected from the group consisting of styrene, acrylonitrile and mixtures thereof.

15. A process according to claim 10, wherein the latex solids is a copolymer of vinyl acetate wherein the copolymerising monomer is selected from the group consisting of a lower alkyl ester of acrylic acid, a lower alkyl ester of methacrylic acid, styrene, acrylonitrile and mixtures thereof.

16. A process for preparing a latex coated inorganic filler which process comprises admixing a particulate inorganic material selected from the group consisting of kaolinitic clay, a calcined kaolinitic clay, a calcium carbonate, silicates of calcium and aluminium, bauxite, talc, mica, alumina trihydrate, silica, carbonates and hydroxides of magnesium, dolomite, calcium sulphate and titanium dioxide with an aqueous suspension of fine carbon black and a natural or synthetic latex composition which comprises a suspension of polymer particles in water wherein the latex solids are selected from the group consisting of a natural rubber, a natural rubber which has been substituted with functional groups, a synthetic rubber, an acrylic copolymer, a poly(vinyl acetate) and a copolymer of vinyl acetate, and dewatering and drying the resultant mixture, the amount of the natural or synthetic latex composition added being such as to provide a coating on the particles of inorganic material of from about 1% to about 10% by weight of latex solids based on the weight of dry inorganic material.

17. A process for preparing an inorganic filler comprising:
(a) forming a dispersed aqueous suspension of fine carbon black which contains from about 5% to 25% by weight, on a dry weight basis, of the carbon black;
(b) forming a dispersed aqueous suspension of a white inorganic material containing from about 50% to about 60% by weight on a dry weight basis, of the inorganic material;
(c) combining the aqueous suspension of the inorganic material with a natural or synthetic latex composition, the latex being employed in an amount such as to provide a coating on the particles of inorganic filler of from about 1% to about 10% by weight of latex solids, based on the weight of the inorganic material;
(d) combining the dispersed aqueous suspension of carbon black with the inorganic material/latex suspension formed in step (c) in proportions such that he quantity of carbon black is from about 0.1% to about 10% on a dry weight basis, based on the weight of the inorganic material; and
(e) spray drying the suspension formed in step (d) to form hollow microspheres of substantially dry material having diameters in the range of from about 0.02 mm to about 0.5 mm.

18. A process for preparing an inorganic filler comprising:
(a) forming a dispersed aqueous suspension of fine carbon black which contains from about 5% to 25% by weight, on a dry weight basis, of the carbon black;
(b) forming a dispersed aqueous suspension of a white inorganic material containing from about 50% to about 60% by weight on a dry weight basis, of the inorganic material;
(c) combining the aqueous suspension of the inorganic material with the dispersed aqueous suspension of carbon black formed in step (a) in proportions such that the quantity of carbon black is from about 0.1% to about 10% on a dry weight basis, based on the weight of the inorganic material;
(d) combining the inorganic material/carbon black formed in step (c) with a natural or synthetic latex composition, the latex being employed in an amount such as to provide a coating on the particles of inorganic material of from about 1% to about 10% by weight of latex solids, based on the weight of the inorganic material; and
(e) spray drying the suspension formed in step (d) to form hollow microspheres of substantially dry material having diameters in the rang of from about 0.02 mm to about 0.5 mm.

19. A process according to claim 17 or 18, wherein the particulate inorganic material is selected from the group consisting of: kaolinitic clay, a calcined kaolinitic clay, a calcium carbonate, silicates of calcium and aluminium, bauxite, talc, mica, alumina trihydrate, silica, carbonates and hydroxides of magnesium, dolomite, calcium sulphate and titanium dioxide.

20. A process according to claim 17 or 18, wherein the latex solids are selected from the group consisting of: a natural rubber, a natural rubber which has been substituted with functional groups, a synthetic rubber, an acrylic copolymer, a poly(vinyl acetate) and copolymers of vinyl acetate.

21. A process for preparing a latex coated inorganic filler which process comprises combining, in aqueous suspension, a particulate inorganic material, a natural or synthetic latex composition and carbon black; and dewatering and drying the resultant mixture; said natural or synthetic latex composition being employed in an amount such as to provide a coating on the particles of inorganic material of from 1% to 10% by weight of latex solids based on the weight of dry inorganic material.

22. A process according to claim 21, wherein the carbon black is employed in an amount such as to provide in the coating from 0.1% to 10% by weight of dry carbon black based on the weight of the inorganic filler.

23. A process according to claim 21, wherein the inorganic material and the latex composition are added, either sequentially or simultaneously, to an aqueous suspension of the carbon black.

24. A process according to claim 23, wherein the aqueous suspension of the carbon black is dispersed with the aid of a dispersing agent.

25. A process according to claim 23, wherein the aqueous suspension of carbon black contains from 5% to 25% by weight of carbon black.

26. A process according to claim 21, wherein the particulate inorganic material is employed in the form of an aqueous suspension.

27. A process according to claim 26, wherein the aqueous suspension of the inorganic material contains from 50% to 65% by weight of the inorganic material.

28. A process according to claim 26, wherein the aqueous suspension of inorganic material is dispersed with the aid of a dispersing agent.

29. A process according to claim 21, wherein the mixture of inorganic material, latex and carbon black is spray dried to form hollow microspheres.

30. A process according to claim 21, wherein the particulate inorganic material is selected from the group consisting of: a kaolinitic clay, a calcined kaolinitic clay, a calcium carbonate, silicates of calcium and aluminium, bauxite, talc, mica, alumina trihydrate, silica, carbonates and hydroxides of magnesium, dolomite, calcium sulphate and titanium dioxide.

31. A process according to claim 21, wherein the latex solids are selected from the group consisting of: a natural rubber, a natural rubber which has been substituted with functional groups, a synthetic rubber, an acrylic copolymer, a poly(vinyl acetate) and copolymers of vinyl acetate.

32. An organic polymer composition which comprises an organic polymeric material and a latex-coated inorganic filler wherein the filler has been treated, in aqueous suspension, with a natural or synthetic latex composition and carbon black, dewatered and dried to form a coating on the filler, the filler being coated with from 1% to 10% by weight of latex solids, based on the weight of dry inorganic filler.

33. An organic polymer composition as claimed in claim 32, wherein the filler is selected from the group consisting of: kaolinitic clay, a calcined kaolinitic clay, a calcium carbonate, silicates of calcium and aluminium, bauxite, talc, mica, alumina trihydrate, silica, carbonates and hydroxides of magnesium, dolomite, calcium sulphate and titanium dioxide.

34. An organic polymer composition as claimed in claim 32, wherein the latex solids is selected from the group consisting of: a natural rubber, a natural rubber which has been substituted with functional groups, a synthetic rubber, an acrylic copolymer, a poly(vinyl acetate) and copolymers of vinyl acetate.

35. A organic polymer composition as claimed in claim 32, wherein the polymeric material is a thermoplastic or a thermosetting material.

36. A latex-coated inorganic filler prepared by combining, in aqueous suspension, a particulate inorganic material, a natural or synthetic latex composition and carbon black; and dewatering and drying the resultant mixture; said natural or synthetic latex being employed in an amount such as to provide a coating on the particles of inorganic material of from 1% to 10% by weight of latex solids based on the weight of dry inorganic material.

37. A coated inorganic material according to claim 36, wherein the carbon black is present in the coating in an amount of from 0.1% to 10% by weight, based on the weight of the dry inorganic material.

38. A coated inorganic material according to claim 36, in the form of hollow microspheres.

39. A coated inorganic material according to claim 36, wherein the particulate inorganic material is selected from the group consisting of: a kaolinitic clay, a calcined kaolinitic clay, a calcium carbonate, silicates of calcium and aluminium, bauxite, talc, mica, alumina trihydrate, silica, carbonates and hydroxides of magnesium, dolomite, calcium sulphate and titanium dioxide.

40. A coated inorganic material according to claim 36, wherein the elastomer is selected from the group consisting of: a natural rubber, a natural rubber which has been substituted with functional groups, a synthetic rubber, an acrylic copolymer, a poly(vinyl acetate) and copolymers of vinyl acetate.

41. An article formed, either partially or wholly, from an organic polymer which comprises an organic polymeric material and a latex coated inorganic filler wherein the filler has been treated, in aqueous suspension, with a natural or synthetic latex composition and carbon black, dewatered and dried to form a coating on the filler, the filler being coated with from 1% to 10% by weight of latex solids, based on the weight of dry inorganic material.

* * * * *